United States Patent [19]
Holder

[11] 4,102,380
[45] Jul. 25, 1978

[54] TIRE BEAD BREAKER MACHINE

[75] Inventor: Charles B. Holder, Bay Springs, Miss.

[73] Assignee: James A. Sumrall, Bay Springs, Miss.

[21] Appl. No.: 789,015

[22] Filed: Apr. 20, 1977

[51] Int. Cl.$^2$ ............................................. B60C 25/08
[52] U.S. Cl. ................................................. 157/1.26
[58] Field of Search .............................. 157/1.17, 1.26

[56] References Cited

U.S. PATENT DOCUMENTS

| 3,362,453 | 1/1968 | Nester | 157/1.17 |
| 3,426,827 | 2/1969 | Whited et al. | 157/1.26 |
| 3,489,198 | 1/1970 | Malinski | 157/1.17 |
| 3,972,363 | 8/1976 | West et al. | 157/1.26 |

Primary Examiner—Al Lawrence Smith
Assistant Examiner—James G. Smith
Attorney, Agent, or Firm—Zarley, McKee, Thomte, Voorhees & Sease

[57] ABSTRACT

A machine frame includes a pair of upstanding frame members interconnected by a pair of telescopic members which include a power cylinder for moving the upstanding members towards and away from each other. A bead breaker arm includes a pair of hooks on one end, the bottom of which pivotally engages a pin on one of the upstanding members while the other hook movably engages another pin spaced above the first pin to allow the arm to move vertically within limits defined by the hook and the opposite end of a curved surface along which the second pin engages as the arm is raised and lowered. The outer free end of the arm includes a pivotal wedge member having an upwardly curved tapered end for engaging the rim and moving between the tire bead and the rim. The other upstanding frame member includes a rim holder for limiting the rim against vertical movement. A tire support cradle is formed from a plurality of arcuately arranged roller rods connected to one of the upstanding frame members and telescopically and rotatably engaging the other frame member to allow for rotation of the tire and inward and outward movement of the outer upstanding frame member relative to the inner upstanding frame member.

12 Claims, 6 Drawing Figures

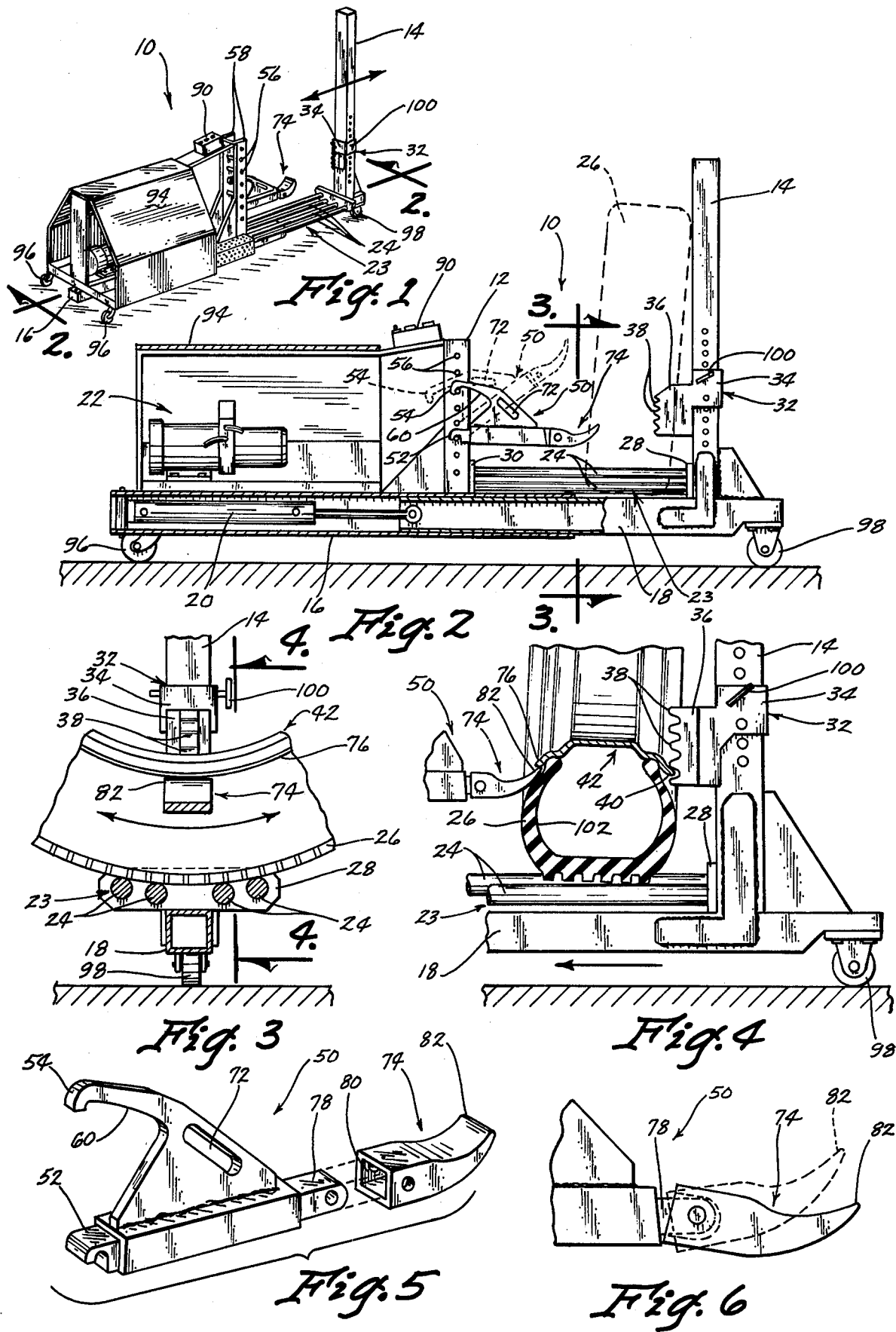

TIRE BEAD BREAKER MACHINE

BACKGROUND OF THE INVENTION

A simple and inexpensive bead breaker machine that will accommodate tires of various sizes is desirable. The machine should have a minimum of parts and be foolproof in operation. The present invention provides such a tire bead breaker machine.

SUMMARY OF THE INVENTION

A bead breaker arm having a pivotal wedge on its outer end is held horizontally in its lowermost position by an upper hook of a pair of hooks engaging vertically spaced apart pins on an upstanding frame member mounted on one of a pair of telescopic frame members interconnecting the one upstanding frame member to an outer upstanding frame member. The outer upstanding frame member includes a rim-engaging bracket to hold the tire against vertical movement when the wedge is pressed against the rim and between the bead of the tire and the rim. The hydraulic cylinder is positioned in the telescopic frame members to move the outer upstanding frame member inwardly and outwardly.

DESCRIPTION OF THE DRAWINGS

FIG. 1 is a perspective view of the tire bead breaker machine of this invention.

FIG. 2 is an enlarged in scale cross-sectional view taken along line 2 — 2 in FIG. 1.

FIG. 3 is a fragmentary cross-sectional view taken along line 3 — 3 in FIG. 2.

FIG. 4 is a vertical elevational view taken along line 4 — 4 in FIG. 3.

FIG. 5 is a perspective view of the bead breaker arm; and

FIG. 6 is a fragmentary side elevational view of the bead breaker arm with the pivotally connected wedge on its outer end.

DESCRIPTION OF THE PREFERRED EMBODIMENT

The tire bead breaker machine of this invention is referred to generally in FIG. 1 by the reference numeral 10 and includes a pair of upstanding frame members 12 and 14 interconnected by a pair of telescopic tubular members 16 and 18. A hydraulic cylinder 20 is positioned in the tubular member 16 and is connected to the telescopic member 18 for moving the upstanding frame member 14 inwardly and outwardly relative to the upstanding member 12.

A two-stage hydraulic pump 22 operates the power cylinder 20 such that it moves at a faster rate when resistance to movement is small and at a slower rate when the resistance is increased to a predetermined pressure. A tire cradle 23 is provided above the telescopic frame mebers 18 and 20 and includes a plurality of rods 24 positioned to provide a curved support for a tire 26, as seen in FIG. 3. The rods 24 are rotatably connected to a mounting plate 28 and telescopically and rotatably connected to an inner mounting plate 30 on the inner upstanding frame member 12. Thus the rods 24 move in a telescopic manner inwardly and outwardly of the mounting support plate 30 as the outer upstanding frame member 14 is moved inwardly and outwardly.

The outer upstanding memer 14 includes a vertically adjustable telescopic bracket 32 selectively positioned on the frame member 14 by a removable pin 100. A jaw 36 is provided on the bracket 32 and includes a plurality of teeth 38 for selective engagement with the bead 40 of a tire rim 42 as seen in FIG. 4. A tire rim is held against vertical movement by the bracket 32.

A bead breaker arm 50 is pivotally positioned on the upstanding frame member 12 and opposes the bracket 32 with the tire 26 and rim 42 positioned therebetween as seen in FIG. 4. The arm 50 includes a pair of vertically spaced apart hook members 52 and 54 for engagement with vertically spaced apart pins 56 interconnecting plate elements 58 forming the upstanding member 12. The hook 54 includes an arcuate surface 60 having a radius of curvature about the pivotal axis of the hook 52 such that the arm 50 may be raised and lowered with the upper pin slidably engaging the curved surface 60 between its outer limits. A hand slot 72 is provided on the arm to allow for selective positioning on the upstanding frame member 12 such that the outer wedge end 74 is generally opposite the rim edge 76, as seen in FIG. 4. The arm 50 includes a male element 78 received in the tubular inner end 80 of the wedge tip end 74. The outer end of the wedge 74 is curved upwardly and tapered to a edge 82.

It is thus seen that the arm 50 is capable of floating and allowing the wedge 74 with its tapered end 82 to follow the contour of the rim 42 starting with rim edge 76 as the outer upstanding frame member 14 is moved inwardly towards the inner upstanding frame member 12 through operation of the hydraulic cylinder 20 connected to controls 90. A hydraulic pump 22 is enclosed by a cover 94 and the frame is supported by three caster wheels 96 and 98. A removable pin 100 allows for vertical selective adjustment of the bracket 32 on the upstanding frame member 14.

In operation it is thus seen that a tire 26 on a rim 42 is positioned on the roller rod cradle 23 and is rotated thereon to the position desired for the bead-breaking operation. The bead breaker arm 50 is positioned on the upstanding frame member 12 with the appropriate pins 56 engaging the hooks 52 and 54. The wedge 74 with its tapered end 82 will be positioned as seen in FIG. 4 to move between the rim edge 76 and the tire sidewall 102, as seen in FIG. 4. The bracket 32 holds the opposite rim edge 40 against vertical movement. Operation of the hydraulic cylinder 22 by the controls 90 cause the cylinder 20 to contract moving the upstanding frame member 14 towards the frame member 12 and thus forcing the tapered end 82 on the wedge 74 between the tire sidewall 102 and the wheel rim 42. The arm 50 is pivotal between the solid line position in the dashline position, as seen in FIG. 2, and with the wedge end 74 being pivotal the arm is free to float as the wedge is threaded between the tire sidewall 102 and the rim 42. Retraction of the arm then allows for rotation of the tire for a repeat of the bead breaking steps at other points around the rim.

I claim:

1. A tire bead breaker machine comprising,
a frame having horizontally spaced apart upstanding members interconnected by a tire support means,
a rim-holding means on one of said upstanding members for engagement with one side of a tire rim,
a bead breaker arm vertically pivotally connected to said other upstanding member and having a wedge pivotally connected for slight pivotal movement on the outer free end of said arm for engagement with the other side of a tire rim between the tire bead and rim, said arm having a first stop means for preventing downward pivotal movement while allowing free upward pivotal movement whereby said wedge may follow the contour of the rim as it moves between said rim and tire bead, and power means operatively connected to said arm for moving said wedge between said tire bead and rim.

2. The structure of claim 1 wherein said first stop means is further defined as a hook on the upper side of said arm and the lower side is pivotally connected to said other upstanding member with said hook being movably connected to cooperating second stop means on said other upstanding member.

3. The structure of claim 2 said second stop means comprises wherein said other upstanding member having a plurality of vertically spaced apart pins and said arm is pivotally connected to one of said pins with said hook engaging another pin spaced above said one pin.

4. The structure of claim 3 wherein said arm being pivotally connected to said one pin is further defined as including a second hook below said first hook for detachable pivotal engagement with said one pin.

5. The structure of claim 4 wherein said arm includes a hand opening for selectively moving said arm on said other upstanding member.

6. The structure of claim 5 wherein said wedge is further defined as being vertically pivotally connected to said arm.

7. The structure of claim 6 wherein said wedge includes an upwardly curved and tapered outer end.

8. The structure of claim 3 wherein said arm includes a curved surface outwardly of said first hook for engagement with said one pin upon said arm being pivoted upwardly.

9. The structure of claim 1 wherein said tire support means includes a plurality of roller rods arranged to form a cradle for a tire.

10. The structure of claim 1 wherein said frame is further defined as including a pair of telescoping frame members interconnecting said upstanding members and said power means comprises a hydraulic cylinder (is) positioned in one of said telescopic frame members and (is) connected to said other telescopic member for moving said one upstanding member towards and away from said other upstanding member.

11. The structure of claim 10 wherein said tire support means includes a plurality of roller rods arranged to form a cradle for a tire and said roller rods are rotatably connected to said one upstanding member and limited against relative linear movement while being operatively telescopically and rotatably connected to said other telescopic frame member.

12. A tire bead breaker maching comprising,
a frame having horizontally spaced apart upstanding members interconnected by a tire support means,
a pair of telescoping frame members interconnecting said upstanding members,
a rim holding means on one of said upstanding members for engagement with one side of a tire rim,
a bead breaker arm vertically pivotally connected at one end of said other upstanding member and having a wedge on the other outer free end for engagement with the other side of a tire rim between the tire bead and rim,
a hook member on the upper side of said arm movably connected to cooperating stop means on said other upstanding member for limiting downward pivotal movement while allowing upward pivotal movement whereby said wedge may follow the contour of the rim as it moves between said rim and tire bead, and
a power means positioned in one of said telescopic frame members and connected to said other telescopic member for moving said one upstanding member towards said other upstanding member to move said wedge between said tire bead and rim.

* * * * *